United States Patent
Seidman et al.

(10) Patent No.: US 7,434,206 B2
(45) Date of Patent: Oct. 7, 2008

(54) IDENTIFYING MEMORY LEAKS IN COMPUTER SYSTEMS

(75) Inventors: David Isaiah Seidman, San Francisco, CA (US); Piotr Findeisen, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 591 days.

(21) Appl. No.: 11/077,826

(22) Filed: Mar. 10, 2005

(65) Prior Publication Data

US 2006/0206885 A1   Sep. 14, 2006

(51) Int. Cl.
*G06F 9/44*   (2006.01)
*G06F 12/00*  (2006.01)

(52) U.S. Cl. .................. 717/124; 717/127; 711/170; 707/200

(58) Field of Classification Search .......... 717/124, 717/127; 711/170; 707/200
See application file for complete search history.

(56) References Cited

U.S. PATENT DOCUMENTS

| | | | |
|---|---|---|---|
| 5,898,872 A * | 4/1999 | Richley ............... 717/121 |
| 5,950,211 A * | 9/1999 | Shealy ............... 707/204 |
| 6,049,666 A * | 4/2000 | Bennett et al. ....... 717/130 |
| 6,167,535 A | 12/2000 | Foote et al. |
| 6,260,187 B1 | 7/2001 | Cirne |
| 6,370,684 B1 | 4/2002 | DePauw et al. |
| 6,513,134 B1 * | 1/2003 | Augsburg et al. ...... 714/38 |
| 6,560,773 B1 | 5/2003 | Alexander et al. |
| 6,658,652 B1 | 12/2003 | Alexander et al. |
| 6,675,379 B1 | 1/2004 | Kolodner et al. |
| 6,782,350 B1 * | 8/2004 | Burnley et al. ...... 702/186 |
| 6,782,462 B2 * | 8/2004 | Marion et al. ....... 711/170 |
| 7,086,064 B1 * | 8/2006 | Stevens ............. 719/310 |
| 7,257,692 B2 * | 8/2007 | Schumacher ......... 711/170 |
| 2003/0028861 A1 * | 2/2003 | Wallman et al. ..... 717/128 |
| 2004/0133759 A1 * | 7/2004 | Sekiguchi .......... 711/170 |
| 2006/0095427 A1 * | 5/2006 | Dickenson .......... 707/6 |

OTHER PUBLICATIONS

Sampsa Hautaniemi et al., "Analysis and visualization of gene expression microarray data in human cancer using Self-Organizing Maps", Machine Learning, 52, 45-66, 2003.*

Maria Jump, Stephen M. Blackburn, Kathryn S. McKinley, "Dynamic object sampling for pretenuring", pp. 152-162, International Symposium on Memory Management, Proceedings of the 4th international symposium on Memory management, Vancouver, BC, Canada, Oct. 24-25, 2004.*

* cited by examiner

*Primary Examiner*—Wei Y. Zhen
*Assistant Examiner*—Chih-Ching Chow

(57) ABSTRACT

Embodiments of the invention relate to identifying sources of memory leaks. In an embodiment, an agent collects information related to object allocations and de-allocations in accordance with a sampling period, and, based on the relationship between object allocations and de-allocations, the agent analyzes the data and reports the results. Other embodiments are also disclosed.

22 Claims, 5 Drawing Sheets

| | | Allocation | De-allocation |
|---|---|---|---|
| 410 | String | 10 | 3 |
| 420 | Integer | 5 | 5 |
| 430 | FP | 25 | 0 |

400

OBJ A() {
  return new OBJ()
}
FIG. 5A
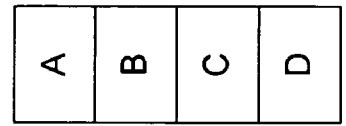
FIG. 5B
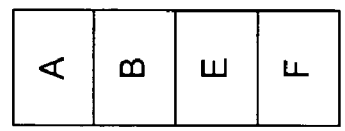
FIG. 5C
F {
  cache obj;
  ...
}
FIG. 5D
D {
  obj = null;
  ...
}
FIG. 5E

IDENTIFYING MEMORY LEAKS IN COMPUTER SYSTEMS

RELATED APPLICATION

This application incorporates by reference co-pending application entitled "AUTOMATED ALERTS FOR RESOURCE RETENTION PROBLEMS," filed Jan. 10, 2005 by Piotr Findeisen et al., Ser. No. 11/032,384.

FIELD OF THE INVENTION

The present invention relates generally to identifying memory leaks in computer systems.

BACKGROUND OF THE INVENTION

Memory leaks refer to the fact that memory continues to be retained by the program using it even though it is no longer needed. Despite the use of garbage collection, memory leaks frequently occur in JAVA program applications. A JAVA memory leak occurs when there are references to an object that will not be used again by the application. Because the application won't use the object while the object occupies memory, the object is a waste of memory. For example, an application may create temporary objects during a J2EE transaction and inadvertently cache references to these objects that cause the objects to be retained permanently, i.e., causing memory leaks. As a result, each time the application performs a transaction, a little more memory is lost. Eventually, the application crashes due to out of memory.

Problems related to memory leaks become worse when they occur in deployed web applications, i.e., those that are actively serving customers. This is because constraints arise in solving those problems. For example, system performance degradation is kept to minimum for analyzing memory leak of running applications; the application should not pause for several seconds; problem analysis cannot require large amounts of memory, etc. Additionally, operators of data centers where web applications are frequently hosted do not typically have sophisticated debugging knowledge, and they must diagnose the problem quickly. Therefore, it is necessary for them to be told exactly where memory leaks may be occurring as soon as those leaks begin.

Existing solutions to deal with memory leaks are numerous, but they each have their own shortcomings. For example, they may be too intrusive to the application and/or do not give the user enough information. They can only find memory leaks in a fraction of the application data. They require user interaction, storage of information about each object, large amounts of memory to produce heap snapshots, heap dumps that are computationally expensive and cannot be used in deployed applications, etc.

SUMMARY OF THE INVENTION

Embodiments of the invention relate to identifying sources of memory leaks. In an embodiment, an agent collects information related to object allocations and de-allocations in accordance with a sampling period, and, based on the relationship between object allocations and de-allocations, the agent analyzes the data and reports the results. Other embodiments are also disclosed.

BRIEF DESCRIPTION OF THE DRAWINGS

The present invention is illustrated by way of example, and not by way of limitation, in the figures of the accompanying drawings in which like reference numerals refer to similar elements and in which:

FIGS. 5A-E are provided to illustrate how method call stacks can help identify sources of memory leaks, in accordance with an embodiment.

DETAILED DESCRIPTION OF VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Overview

Figure 1:
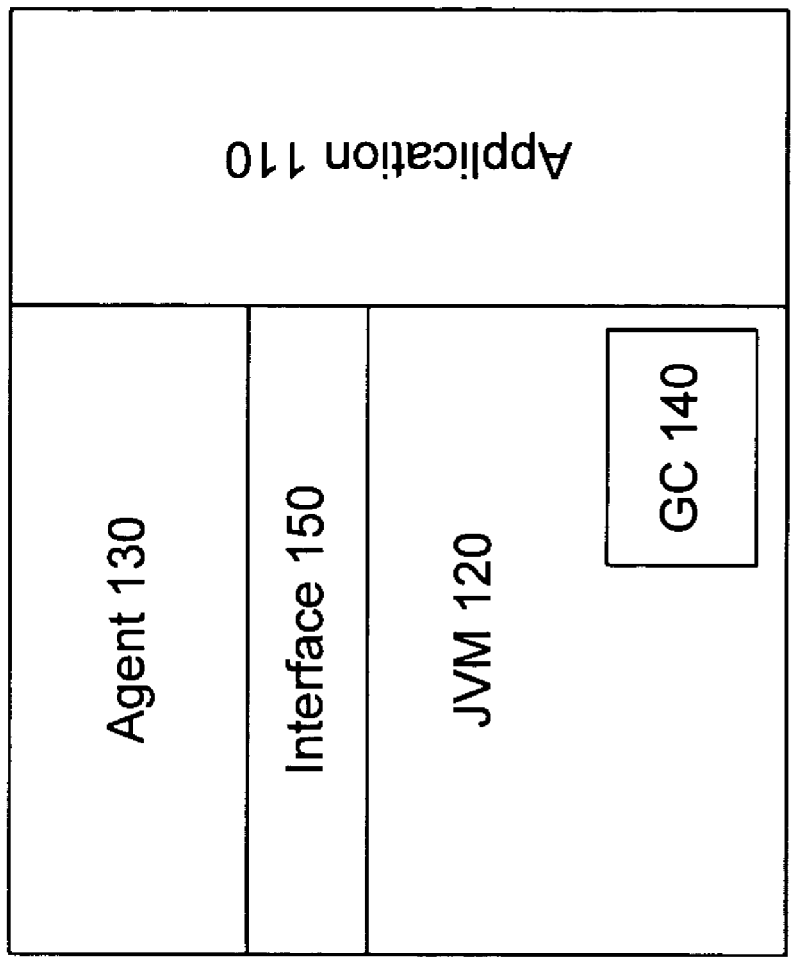
FIG. 1 shows an arrangement upon which embodiments of the invention may be implemented.

FIG. 1 shows an arrangement 100 upon which embodiments of the invention may be implemented. Arrangement 100 includes a JAVA application 110, a JAVA Virtual Machine (JVM) 120, an agent 130, a garbage collector 140, and an interface 150.

JVM 120, as known in the art, is an execution environment that converts JAVA bytecode of application 110 into machine language and executes it. In the object-oriented paradigm including JAVA, objects are members (or instances) of classes, and these classes are stored in "class" files, which include bytecode in the JAVA environment. Application 110 uses different classes or categories of objects. Class files are loaded into JVM 120 when application program 110 starts.

Agent 130 dynamically and automatically collects information related to object allocation and de-allocation, performs data analysis, and reports analyzed results to users. Dynamic indicates that agent 130 performs its functions while application 110 is running and automatic indicates that agent 130 performs those functions without intervention from a user. Agent 130, based on the collected data, analyzes it, e.g., determines the ratio of object allocation and de-allocation for each class, the changes in the number of allocations and de-allocations, the changes in heap size over time, the leak rate, etc., and provides the results to users. Even though agent 130 is described as performing many functions, each of these functions may be performed by different threads and/or processes, and the invention is not limited to how these functions are performed. For example, a first thread and/or process may collect the data while a second thread performs data analysis, and a third thread reports the results, etc. Generally, agent 130 is linked into JVM 120 during initialization of JVM 120 wherein, during this time, agent 130, via programming code, registers with JVM 120 events that agent 130 wants to be notified of. In an embodiment, agent 130 includes computer-executable instructions and calls a function via interface 150 to request that JVM 120 notifies agent 130 when a class load and object de-allocation occurs.

Garbage collector 140 is responsible for finding objects that cannot be used any more and returns the objects to the free pool. In effect, garbage collector 140 frees up memory for other usages.

Interface 150 allows agent 130 to communicate with JVM 120 and application 110. Examples of publicly-available interfaces include the JAVA Virtual Machine Tool Interface (JVMTI), the JAVA Virtual Machine Profiler Interface (JVMPI), etc. Those skilled in the art will recognize that the JVMTI provides capability for tagging objects, e.g., when they are allocated and providing information related to object allocations and de-allocations. Depending on embodiments, interface 150, such as the JVMTI, upon request, provides information related to object allocation and de-allocation to agent 130. Further, interface 150, having information from garbage collector 140, notifies agent 130 when an object is freed. Generally, there are "active" and "inactive" objects in memory. Active objects are "alive" and can be used by application 110 while inactive objects are no longer used by application 110 and will be freed by garbage collector 140.

Data Collection

In the JAVA environment, objects are allocated with a statement "new" object. During initialization, e.g., when agent 130 is loaded into memory, agent 130 requests that JVM 120 notify agent 130 every time a class is loaded. When class files are about to be loaded, JVM 120, via interface 150, provides the class files to agent 130, and agent 130, having access to the class files, instruments these files. Agent 130, parsing through the files, determines the location of object allocation (e.g., the location with the statement "new" object), injects additional bytecode into the class files, and returns the instrumented class files to JVM 120 for it to load these files into memory. When the instrumented class files are executed, the additional code causes information about object allocations to be recorded, e.g., saved in a specified location, a file, etc., accessible by agent 130. For example, if a class file originally includes the statement "new object-A,"

then agent 130, recognizing such statement, instruments the class file to read if (data_collection is on) {record information about allocation of object A to file Record;} new object-A

Generally, information about object allocation includes the name of the class the new object belongs to, the line number of the method in which the object is allocated, the name of the thread executing the method, the calling context (e.g., the method call stack trace, a currently executing transaction type, etc.), etc. The information recorded by agent 130, depending on agent configuration, also includes the line number in the method, the thread name, and the calling context at each measured object allocation. This information may be provided explicitly through the interface, or via bytecode instrumentation. For example, the line number can be provided statically during the instrumentation, or retrieved dynamically by analyzing the current thread stack trace at the time the object is allocated.

After an object is allocated, depending on embodiments of the invention, JVM 120, via interface 150, such as the JVMTI, tags such object so that, based on the tag, object de-allocation may be determined. Tagging is done by marking the object. At initialization, agent 130 also requests that garbage collector 140, via interface 150, notify agent 130 when each of those objects is de-allocated. When an object is de-allocated, JVM 120 in conjunction with garbage collector 140, recognizing the request, provides appropriate information including the name of the object class or type. JVM 120 invokes a specified entry point of a function in agent 130, and, via this function, provides the requested data. Agent 130 then processes the information provided in this function. Alternatively, in embodiments that interface 150 can provide information about object allocation, agent 130 requests that interface 150 provide such information without performing instrumentation in the class files. In response, interface 150, when appropriate provides such information.

Agent 130 uses sampling techniques to collect information related to allocation and de-allocation of objects. Agent 130 collects the information based on a frequency. That is, agent 130 collects the data for a time interval, skips collecting for another time interval, resumes collecting, then skips collecting, etc. For example, agent 130, for every 1 second, collects information for 50 ms. In such an embodiment, agent 130 collects data for 50 ms, "sleeps" or skips collecting data for 950 ms, then resumes collecting data for 50 ms, and skips collecting for another 950 ms, and so on. Different collecting frequencies are within the scope of embodiments of the invention.

Agent 130 also collects data based on calculated error rate. In general, the expected error in a set of sampling data is the square root of the number of samples over the number of samples. For example, if there are 10,000 samples, then the expected error is the square root of 10,000 over 10,000 or 100/10,000 or 0.01, or 1%. Because the error rate inversely depends on the number of sampling data, the error rate decreases or the precisions increases as the number of data samples increases or the longer application 110 is executed with data collection. In the embodiment with 50 ms of sampling per second, information on 30,000 allocations per minute may be obtained, and the expected error rate on this set of data is approximately 0.5%, which is acceptable in many situations and provides high confidence that the collected data is representative of activity through out the application. Alternatively and/or additionally, agent 130 keeps the total amount of time spent collecting data below a predetermined value, e.g., 1%, 3%, 5%, etc., of total execution time.

Agent 130 includes mechanisms to dynamically enable and disable data collection events. A timer thread controlled by the operating system is created that can pause itself during the "sleep" or dormant period and wake up to collect data. For example, in the embodiment using bytecode instrumentation a conditional flag is set during the wake-up time and reset during the dormant time. In the above example, "data_collection" is the conditional flag and is set to "true" during the 50 ms of collecting data and is reset to "false" during the 950 ms of non collecting data.

Agent 130 also obtains information on the overall object de-allocation rate based on data arriving from garbage collector 120 via interface 150. In an embodiment, such rate is measured in bytes per time unit. Further, since, in various situations, memory leaks, if they exist, constitute only a very small fraction of allocated objects, the overall object allocation rate, also measured in bytes per time unit, is assumed to be the same as the object de-allocation rate, without losing the accuracy.

In various embodiments, agent 130 collects data after application 110 reaches a steady state, and thus avoids collecting data during initialization because during this time many objects are allocated, which, by design, are intended not to be de-allocated, and thus do no represent memory leaks. After initialization, application 110 begins to accept transaction request and executes such request. Depending on implementations, the steady state is reached when the transaction request is serviced, the transaction is executed, a period of time has elapsed since initialization, when a number of transactions occur, etc. Alternatively, the steady state is reached when application 110 enters a predetermined entry point that is known to the system, specified by a user, etc. A transaction may be recognized by application 110 and/or a thread/process of application 110 entering an entry point wherein the entry point is asserted by the system and/or by a programmer programming application 110. In the JAVA environment, examples of entry points include "dopost," "service," etc.

Figure 2:
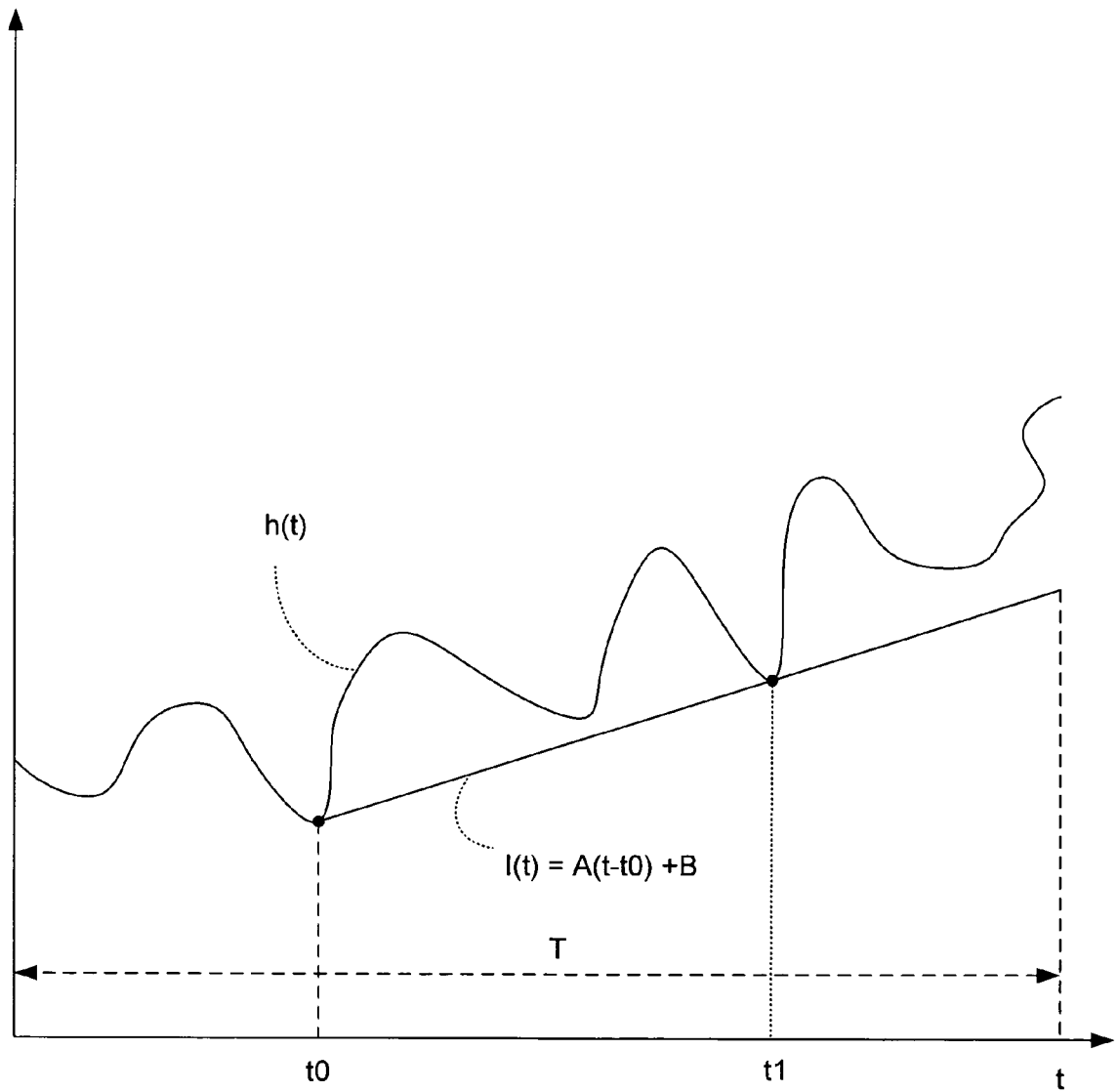
FIG. 2 is a chart depicting a function of resource usage over time that is indicative of resource retentions or potential memory leaks, in accordance with an embodiment.

In an embodiment, agent 130 watches for a presence of a memory leak based on the changes in heap size, as described in the above-mentioned incorporated-by-reference pending application, entitled "AUTOMATED ALERTS FOR RESOURCE RETENTION PROBLEMS." In this embodiment, Agent 130 identifies potential memory leaks by identifying resource retention over time. If the resource comprises the available memory for application 110, then agent 130 determines the heap size after garbage collection at various times t. Mechanisms to determine the heap size are known to those skilled in the art. FIG. 2 is a chart depicting a hypothetical resource usage function h(t) over a set of times T that is indicative of resource retentions or potential memory leaks. In FIG. 2, resource usage function h(t) exhibits a tendency of its minima h(t0) and h(t1) to have higher values with time, such that the slope A of the linear function I(t) is positive, e.g., greater than zero. Such a positive slope indicates the trend that an increasing amount of resources are being retained or the heap size increases as time elapses. This is indicative of a resource retention problem. Agent 130 interprets the slope A as the memory leak rate. FIG. 2 in this application resembles FIG. 4 in the incorporated application.

Data Analysis

Figure 3:
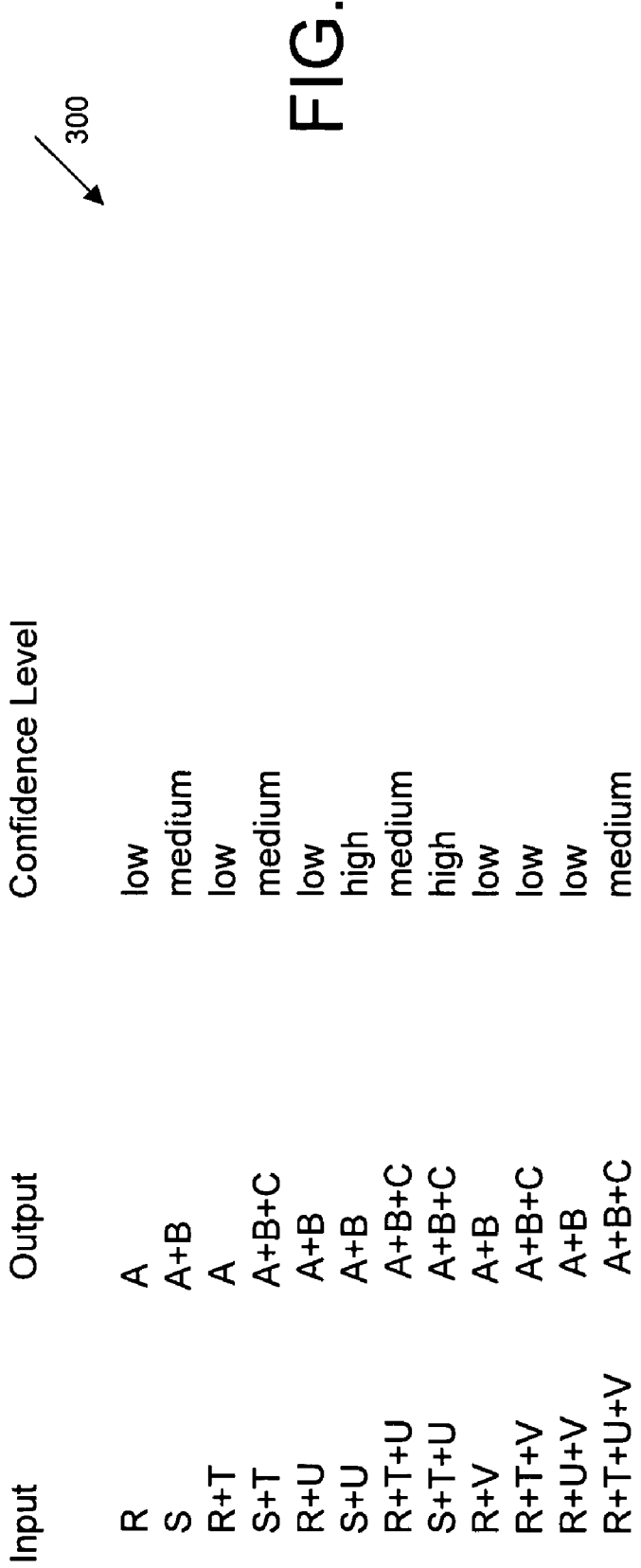
FIG. 3 shows a table illustrating confidence levels and outputs provided by the agent of FIG. 1, in accordance with an embodiment.

Agent 130 identifies patterns and/or relationships between allocation and de-allocation of objects and, from these patterns/relationships, identifies objects that could be a part of memory leaks. A user, by reviewing the analyzed data provided by agent 130, may verify the sources of memory leaks and take appropriate actions including modifying the code in application 110 that is the cause of the leaks. Agent 130 analyzes the collected data and determines potential leaks based on one or a combination of the various data types including the difference between the ratios of object allocation and de-allocation for each class, or between the number of object allocations and the number of object de-allocations; the changes, e.g., increases/decreases in these differences over time, after a transaction is executed by application 110, by one of its method, thread, process, etc.; the changes in heap size that may be identified by using FIG. 2; the similarity in the number of allocations and the leak rate, etc. Usually, the combinations of the data types provide the higher probability that the memory leak is correctly identified, even though, in many instances, a set of data type may provide conclusory evidence or high probability that an object is a part of the leak. In an embodiment, agent 130 assigns probability or confidence level of identifying a source of memory leaks, to the various data types and their combinations, and reports these confidence levels and/or the data types to the user. Typically, the more data types is recognized by agent 130, the higher confidence that the source of the memory leak has been identified by agent 130. FIG. 3 shows a table 300 illustrating the confidence levels and outputs provided by agent 130, and their corresponding input or data types. Followings are explanations for table 300.

Input Data (Types):
R—difference in allocation ratio and de-allocation ratio for each class, obtained by sampling; includes allocation stack trace context
S—difference between a number of allocations and a number of de-allocations for each class, obtained by a combination of object tagging and sampling; includes allocation stack trace
T—transaction context identification during object allocations, an addition to R or S
U—changes in R or S over time
V—global memory leak rate and global object allocation rate Output Data:
A—leaking objects type/class
B—allocation sites (stack trace context) of leaking objects
C—transaction type (transaction context) allocating the leaking objects Even though table 300 shows three confidence levels including low, medium, and high, various other degrees of confidence levels and ways to express the confidence levels, such as numbers, scores, etc., are within the scope of embodiments of the invention. For example, R, by itself, may be assigned a confidence level of 60%, while R+U and R+U+T may be assigned a confidence level of 65% and 75%, respectively. These numerical confidence levels may be obtained based on experimental data, the user's judgment, experience, etc. Further, other types and the number of outputs different from what is shown in table 300 are within scope of embodiments of the invention.

Generally, for example, if objects of a given class are allocated a lot of times, but are not de-allocated or the number of de-allocations is much less than the number of allocations, then this is indicative that retention of memory for that class exists, and it is probable that memory leak has occurred. The increase in the difference between the number of object allocations and de-allocations as execution of application 110 continues is indicative of probability of memory leaks. Objects allocated for a transaction are usually temporary for that transaction. Once the transaction is complete, objects allocated for that transaction should be released or de-allocated, and if these objects are not de-allocated, they are a potential component of memory leaks. Even though, by itself, the difference in the number of allocations and de-allocations for an object provides an indication of potential leak, and this leak is more probable if the difference increases and/or there is a difference while it is not expected to be different, e.g., in a transaction period where the object allocation should be followed by de-allocation.

In a given context, e.g., call stack, transaction, etc., if the number of object allocations for an object is similar to the leak rate, then that context is highly probable the source of the leak. For example, if the heap size increases ten objects per second and the number of allocations, at a given call stack, is also about ten objects per second, then this context is highly probable to cause the leak. Conversely, in another context, if the number of allocations is much slower or faster than the leak rate, then probably the context does not cause the leak. In an embodiment, agent 130 estimates the rate of object allocations at a given context by multiplying the overall object allocation rate by the ratio of object allocation at a given context. The ratio of object allocation at a given context is the number of object allocations observed at the given context divided by the number of all observed object allocations.

In an embodiment, for example, when object tagging is not available and agent 130 is not notified about de-allocation of the tagged objects, agent 130 determines the presence of memory leak based on the ratios of object allocations and de-allocations for each class. A ratio of object allocation for a class is the number of objects allocated for that class over the total number of all allocated objects. Similarly, a ratio of object de-allocation for the same class is the number of objects de-allocated for that class over the total number of all de-allocated objects. Agent 130 measures the ratio of object allocations and de-allocations for each class, and if, for a given class, e.g., class C, the ratio of object de-allocations is smaller than the ratio of allocations, and the difference in the two ratios is larger than a threshold of expected measurement error, then agent 130 determines that objects of class C may be a part of a memory leak. As previously described in the section "DATA COLLECTION," the precision of these measurements increases with time, and eventually reaches any precision desired by agent 130. The desired precision is configurable, e.g., may be set by a user, programmable in agent 130, etc.

The data analysis performed by agent 130 can be described by the following pseudo-code:

```
for (each class C) {
    If (allocations of class C have been recorded with the
    desired precision) {
        If (allocation ratio for class C - de-allocation ratio for
    class C > threshold value) {
            Notify user about possible memory leak of class C;
        }
    }
}
```

Figure 4:
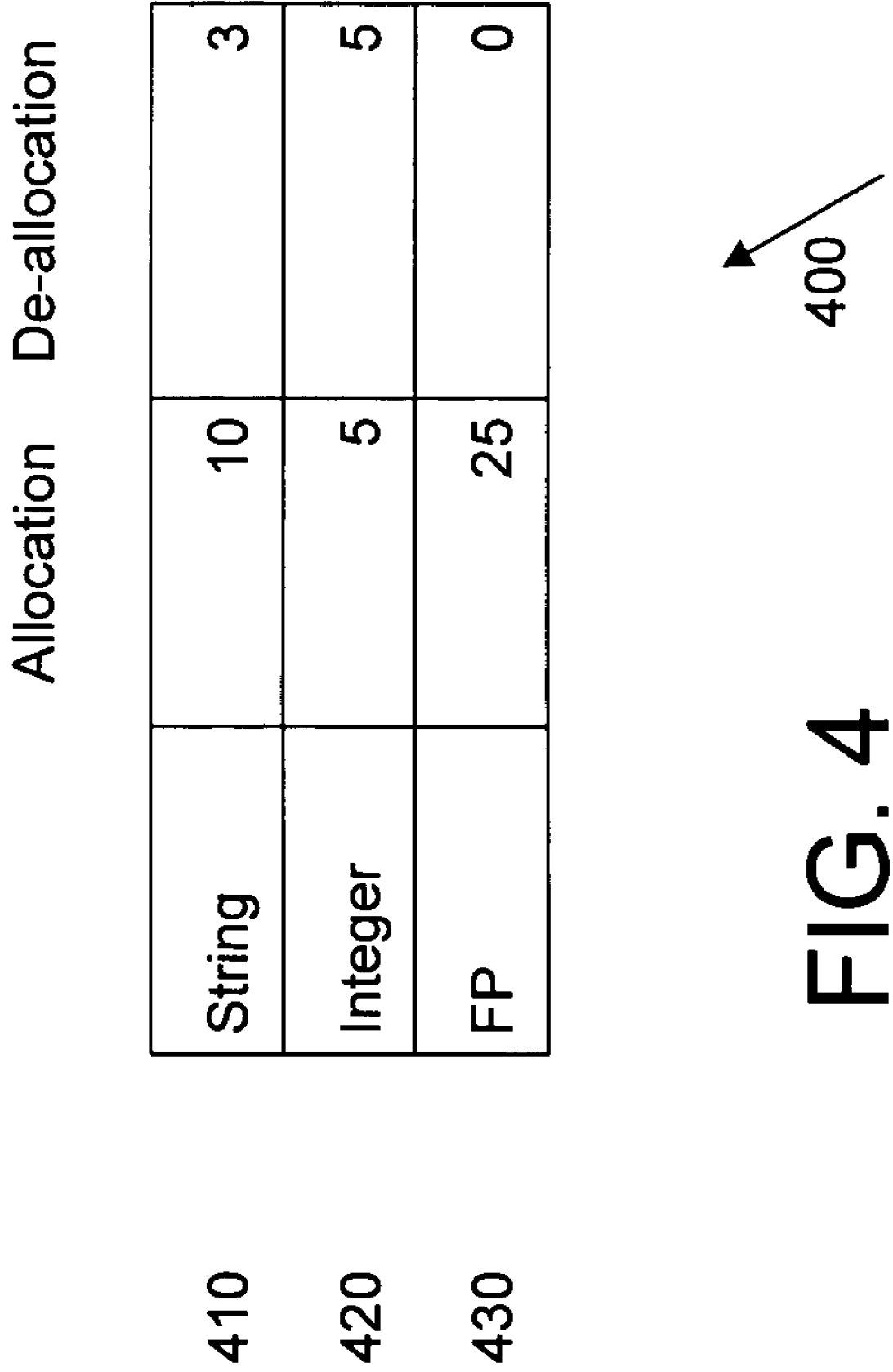
FIG. 4 shows a table illustrating data analysis in accordance with an embodiment.

FIG. 4 shows a table 400 illustrating data analysis in accordance with an embodiment of the invention. In row 410, ten string objects are allocated while three string objects are de-allocated. In row 420, five integer objects are allocated and all five are de-allocated. Similarly, in row 430, 25 floating-point objects are allocated and zero is de-allocated. Based on this set of data, the class of floating-point is the most "suspicious" that may cause memory leaks, the class of string is less suspicious, and the class of integer does not cause memory leaks. Further, at a later time, for example, if the number of allocations for the floating-point class increases to 35 while the number of de-allocation remains 0, then this data indicates even a higher probability of memory leaks. For another example, also at later time, if the number of allocations for the class of string remains at ten while the number of de-allocation increases to five, then the probability of memory leaks by the class of string decreases.

FIGS. 5A-E are provided to illustrate how method call stacks can help identify sources of the memory leak. For illustration purposes, FIG. 5A shows that object OBJ is allocated in method A while FIGS. 5B and 5C show two method stacks 500B and 500C related to the invocation of method A. In FIG. 5B, method A is invoked by the order of methods F, E, B, and A, and in FIG. 5C, the same method A is invoked in the order of methods D, C, B, and A. Further, in FIG. 5D, method F caches object OBJ while, in FIG. 5E, method D releases object OBJ, e.g., setting OBJ=null. Reviewing stack 500B reveals that caching object OBJ in method F causes object OBJ to be retained after the transaction is complete while reviewing stack 500C reveals that method D de-allocates object OBJ before the transaction is complete. As a result, memory leak occurs in call stack 500B while memory leak does not occur in call stack 500C. In an embodiment, agent 130 reports that object of type OBJ is probably leaking in the context of the call stack F, E, B, and A.

Computer

A computer may be used to run program application 110, JVM 120, agent 130, etc., to perform embodiments in accordance with the techniques described in this document, etc. For example, a CPU (Central Processing Unit) of the computer executes program instructions implementing the functions of agent 130 by loading the program from a CD-ROM to RAM and executes those instructions from RAM. The program may be software, firmware, or a combination of software and firmware. In alternative embodiments, hard-wire circuitry may be used in place of or in combination with program instructions to implement the described techniques. Consequently, embodiments of the invention are not limited to any one or a combination of software, firmware, hardware, or circuitry.

Instructions executed by the computer may be stored in and/or carried through one or more computer readable-media from which a computer reads information. Computer-readable storage media may be magnetic medium such as, a floppy disk, a hard disk, a zip-drive cartridge, etc.; optical medium such as a CD-ROM, a CD-RAM, etc.; memory chips, such as RAM, ROM, EPROM, EEPROM, etc. Computer-readable media may also be coaxial cables, copper wire, fiber optics, acoustic, electromagnetic waves, capacitive or inductive coupling, etc.

ADVANTAGES OF EMBODIMENTS OF THE INVENTION

Embodiments of the invention are advantageous over other approaches. Program developers can identify the locations of the memory-leaked objects and thus modify the code to fix the problems. Embodiments require low throughput overheads, low and even none of the pause time in the running application, little memory intrusion, etc., and yet provide highly accurate analysis. Since object allocation and de-allocation are numerous, the collection of data by sampling results in a data set sufficiently good for agent 130 to analyze such data. For example, in a sample measurement, with 50 ms of sampling per second, information on 30,000 allocation per minutes may be collected, which provides an approximated error rate of 0.5% and provide high confidence that the collected data is representative of activity throughout the application. Embodiments of the invention can be used to find leaks anywhere in the application. They can pinpoint the source of the leaks, not just report the existence of a leak. They perform analysis and report automatically without the need for user intervention, etc.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for identifying a source of memory leak in a program, comprising:
   while the program is running obtaining information related to memory allocation of objects;
   obtaining information related to memory de-allocation of the objects;
   providing information related to the source of the memory leak based on one input type related to allocation and de-allocation of objects or a combination of input types related to allocation and de-allocation of objects, said input types comprising:

first difference in ratios of object allocation and de-allocation for a class;

second difference between a number of allocations and a number of de-allocations of an object;

a change in the first difference over time during execution of the program;

a change in the second difference over time during execution of the program;

a change in the first difference after a transaction of the program is executed;

a change in the second difference after a transaction of the program is executed;

a change in a heap size used by the program during its execution; and similarity in the number of allocations of the object and a leak rate;

assigning a probability level to an identified source of memory leak, wherein the probability level is determined by particular input types related to allocation and de-allocation of objects, said particular input types contained in a set of input types, related to allocation and de-allocation of objects, wherein the step of obtaining the information related to memory allocation is performed in one or a combination of adding additional code to a class file that causes the information to be provided when the class file is being executed; and requesting an interface to provide the information.

2. The method of claim 1 wherein adding the additional code occurs when the class file is about to be loaded into memory.

3. The method of claim 1 further comprising the step of tagging the object wherein, based on tagging, the information related to de-allocation of the object may be obtained.

4. The method of claim 1 wherein the information related to the allocation and/or the information related to the de-allocation is obtained based on a sampling period.

5. The method of claim 1 wherein the information related to the allocation and/or the information related to the de-allocation is based on a percentage of time spending in collecting the information and time spending executing the program.

6. The method of claim 1 wherein, upon initialization of a JAVA Virtual Machine, an agent registers with the JAVA Virtual Machine events that the agent is interested in being notified of.

7. The method of claim 1 wherein the program is written in the JAVA language, and the class file includes JAVA bytecode.

8. The method of claim 1 wherein the information related to the memory allocation and the information related to the memory de-allocation are obtained after the program reaches a steady state.

9. A system for providing information, comprising:
a JAVA virtual Machine;
an agent including computer-executable instructions;
a processor processing data stored in memory; and
a class file;
wherein the JAVA Virtual Machine provides the class file to the agent when the class file is about to be-loaded into the memory;
the agent adds additional code into the class file in order to collect information related to memory allocation of an object based on a frequency including a first period of collecting the information and a second period of skipping collecting the information; and the agent returns the instrumented class file to the JAVA Virtual Machine for it to load the instrumented class file into the memory;

while the instrumented class file is being executed by the processor the additional code causes the information to be provided; and the information is for use in identifying a source of memory leak;

wherein the agent assigns a probability level to the source of memory leak, wherein the probability level is determined by input types related to allocation de-allocation of objects, said input types comprising:

first difference in ratios of object allocation and de-allocation for a class;

second difference between a number of allocations and a number of de-allocations of an object;

a change in the first difference over time during execution of the program;

a change in the second difference over time during execution of the program;

a change in the first difference after a transaction of the program is executed;

a change in the second difference after a transaction of the program is executed;

a change in a heap size used by the program during its execution; and similarity in the number of allocations of the object and a leak rate.

10. The system of claim 9 wherein an amount of the information is based on a percentage of time collecting the information and time executing a program using the class file.

11. The system of claim 10 wherein the percentage is based on a calculated error rate caused by the frequency.

12. The system of claim 9 wherein the agent is linked into the JAVA Virtual Machine during initialization of the JAVA Virtual Machine.

13. The system of claim 9 wherein the agent registers with the JAVA Virtual Machine events that the agent desires the JAVA Virtual Machine to notify the agent.

14. The system of claim 9 further comprising a garbage collector providing information related to object de-allocation.

15. A computer-readable storage medium embodying instructions for a computer to perform a method for identifying a source of a memory leak in a program, the method comprising:

based on a sampling frequency, collecting first input types related allocations of objects, and collecting second input types related to de-allocations of the objects, and for a class of objects, the input types comprises:

determining an allocation ratio for the class;

determining a de-allocation ratio for the class;

determining a difference between the allocation ratio and the de-allocation ratio;

comparing the difference against a threshold; and based on results of comparing, determining whether objects of the class are part the source of the memory leak, including assigning a probability level to the objects, wherein the probability level is determined by the input types.

16. The computer-readable storage medium of claim 15 wherein the threshold is based on an error rate that is based on a number of sampling data.

17. The computer-readable storage medium of claim 16 wherein the error rate decreases when the program continues to be executed.

18. A method for determining sources of memory leaks in a program, comprising:

associating each input type to a confidence level that indicates a probability that an object is a component of the memory leaks, said input type related to allocation de-allocation of objects;

wherein a confidence level based on two or more input types is based on two or more confidence levels each associated with a input type of the two or more input types; and while the program is running, based on a sampling frequency, collecting a plurality of input types related to allocations and de-allocations of objects of the program; and based on the collected input types, providing confidence levels associated with the input types;

wherein an input type is selected from:

first difference in a ratio of object allocation and a ratio of object de-allocation of a class;

a change in the first difference over time while the program is running;

a change in the first difference after a transaction of the program is executed;

second difference in a number of allocations and a number of de-allocation for an object;

a change in the second difference over time while the program is running:

a change the second difference after a transaction of the program is executed;

a change in a heap size of the program;

similarity in a number Of allocations of an object and a leak rate.

19. The method of claim 18 wherein the sampling frequency is based on one or a combination of an error rate; and a percentage of time spending to collect the input types over time executing the program.

20. A system comprising:

means for determining, in a computer, a memory leak rate of a program;

means for determining a number of allocations of an object;

means for determining, in a computer, whether the object is the source of the memory leak;

wherein determining, in a computer, whether the object is the source of the memory leak is based on the memory leak rate and the number of allocations of the object; and all determining is performed while the program is being executed;

means for assigning a probability level to the object as the source of memory leak, wherein the probability level is determined by a set of data types including at least one of the memory leak rate and the number of allocations of the object;

wherein determining whether the object is the source of the memory leak is based further on one or a combination of:

first difference in a ratio of object allocation and a ratio of object de-allocation of a class;

a change in the first difference over time while the program is running;

a change in the first difference after a transaction of the program is executed;

second difference in a number of allocations and a number of de-allocation for an object;

a change in the second difference over time while the program is running;

a change the second difference after a transaction of the program is executed; and a change in a heap size of the program.

21. The system of claim 20 wherein determining the number of allocations of the object is by one or a combination of:

instrumenting a class file including computer code related to the object; and requesting an interface to provide information related to the number.

22. The method of claim 18, wherein the probability level is determined by input types contained in a selected set of input types.

* * * * *

UNITED STATES PATENT AND TRADEMARK OFFICE
CERTIFICATE OF CORRECTION

| | | |
|---|---|---|
| PATENT NO. | : 7,434,206 B2 | Page 1 of 1 |
| APPLICATION NO. | : 11/077826 | |
| DATED | : October 7, 2008 | |
| INVENTOR(S) | : David Isaiah Seidman et al. | |

It is certified that error appears in the above-identified patent and that said Letters Patent is hereby corrected as shown below:

In column 9, line 55, in Claim 9, delete "virtual" and insert -- Virtual --, therefor.

In column 10, line 12, in Claim 9, after "allocation" insert -- and --.

In column 10, line 49, in Claim 15, after "objects" delete "," and insert -- ; --, therefor.

In column 10, line 57, in Claim 15, after "part" insert -- of --.

In column 11, line 3, in Claim 18, after "allocation" insert -- and --.

In column 11, line 24, in Claim 18, after "running" delete ":" and insert -- ; --, therefor.

In column 11, line 25, in Claim 18, after "change" insert -- in --.

In column 11, line 28, in Claim 18, delete "Of" and insert -- of --, therefor.

In column 12, line 25, in Claim 20, after "change" insert -- in --.

Signed and Sealed this

Fourth Day of August, 2009

JOHN DOLL
*Acting Director of the United States Patent and Trademark Office*